US010832723B1

(12) United States Patent
Nave et al.

(10) Patent No.: US 10,832,723 B1
(45) Date of Patent: Nov. 10, 2020

(54) REWINDER TAPE DRIVES

(71) Applicant: International Business Machines Corporation, Armonk, NY (US)

(72) Inventors: Shawn M. Nave, Tucson, AZ (US); Lee Jesionowski, Tucson, AZ (US); Michael Philip McIntosh, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/736,528

(22) Filed: Jan. 7, 2020

(51) Int. Cl.
*G11B 15/43* (2006.01)
*G11B 15/46* (2006.01)
*G11B 15/32* (2006.01)
*G11B 5/008* (2006.01)
*G11B 15/093* (2006.01)

(52) U.S. Cl.
CPC .......... *G11B 15/32* (2013.01); *G11B 5/00813* (2013.01); *G11B 15/093* (2013.01)

(58) Field of Classification Search
CPC .............. G11B 15/448; G11B 5/00817; G11B 15/1883; G11B 15/24; G11B 15/43; G11B 15/46; G11B 5/584; G11B 15/6653; G11B 15/00; G11B 15/29
USPC ........................ 360/74.3, 77.12, 91, 93, 96.1
See application file for complete search history.

(56) References Cited

U.S. PATENT DOCUMENTS

| | | | |
|---|---|---|---|
| 4,531,166 | A | 7/1985 | Anderson |
| 5,956,198 | A | 9/1999 | Kulakowski et al. |
| 6,286,078 | B1 | 9/2001 | Fuld |
| 6,871,810 | B2 | 3/2005 | Barndt et al. |
| 6,918,553 | B2 | 7/2005 | Zwettler et al. |
| 7,016,138 | B2 | 3/2006 | Egan |
| 7,246,210 | B2 | 7/2007 | Georgis et al. |
| 10,497,391 | B1 * | 12/2019 | Miyamura ......... G11B 5/00817 |

FOREIGN PATENT DOCUMENTS

GB        2149184 A      6/1985

OTHER PUBLICATIONS

Geller, S. B., "Care and Handling of Computer Magnetic Storage Media," Computer Science and Tecnology, NBS Special Publication 500-101, Jun. 1983, pp. 1-128.
Jesionowski et al., U.S. Appl. No. 14/683,077, filed Apr. 9, 2015.

* cited by examiner

*Primary Examiner* — Nabil Z Hindi
(74) *Attorney, Agent, or Firm* — Zilka-Kotab, P.C.

(57) ABSTRACT

A computer-implemented method includes instructing performance of a data operation on a magnetic recording tape using a primary drive, wherein the primary drive rewinds the magnetic recording tape onto a spool at a first tension. The method also includes instructing transfer of the magnetic recording tape to a rewinder drive after performance of the data operation and instructing the rewinder drive to perform a low-tension rewind operation. The low-tension rewind operation includes unspooling the magnetic recording tape from the spool and rewinding the magnetic recording tape onto the spool at a second tension lower than the first tension.

20 Claims, 11 Drawing Sheets

REWINDER TAPE DRIVES

BACKGROUND

The present invention relates to data storage systems, and more particularly, this invention relates to low cost rewinder tape drives and use thereof, e.g., in tape libraries.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick®, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

As tape storage technology progresses, more information is stored on a single tape cartridge. Within tape media technologies, the data being stored to the tape media is increasing in size and the size of the particles that are read/written on the tape is decreasing. As the size of these particles decrease, the alignment of these data-containing particles with the read/write elements of the tape head during operation becomes more challenging. Tape media substrate may begin to creep over time, especially in relatively hotter and/or wetter environments. The creeping of tape media prevents data that was once written on the tape media from being read by the tape drive. Creeping of the tape media misaligns the data-containing particles in relation to the read/write elements of the tape head.

SUMMARY

A computer-implemented method, according to one embodiment, includes instructing performance of a data operation on a magnetic recording tape using a primary drive, wherein the primary drive rewinds the magnetic recording tape onto a spool at a first tension. The method also includes instructing transfer of the magnetic recording tape to a rewinder drive after performance of the data operation and instructing the rewinder drive to perform a low-tension rewind operation. The low-tension rewind operation includes unspooling the magnetic recording tape from the spool and rewinding the magnetic recording tape onto the spool at a second tension lower than the first tension.

A computer program product, according to another embodiment, includes a computer readable storage medium having program instructions embodied therewith. The program instructions are executable by a computer to cause the computer to perform the foregoing method.

A system, according to another embodiment, includes a primary drive configured to perform data operations on magnetic recording tapes and a rewinder drive configured to perform a low-tension rewind on magnetic recording tapes. The system also includes a processor in communication with the drives. The system includes logic integrated with the processor, executable by the processor, or integrated with and executable by the processor. The logic is configured to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes instructing performance of a data operation on a magnetic recording tape using a primary drive, wherein the primary drive rewinds the magnetic recording tape onto a spool at a first tension. The method also includes instructing transfer of the magnetic recording tape to a rewinder drive after performance of the data operation and instructing the rewinder drive to perform a low-tension rewind operation. The low-tension rewind operation includes unspooling the magnetic recording tape from the spool and rewinding the magnetic recording tape onto the spool at a second tension lower than the first tension.

In another general embodiment, a computer program product includes a computer readable storage medium having program instructions embodied therewith. The program instructions are executable by a computer to cause the computer to perform the foregoing method.

In another general embodiment, a system includes a primary drive configured to perform data operations on magnetic recording tapes and a rewinder drive configured to perform a low-tension rewind on magnetic recording tapes. The system also includes a processor in communication with the drives. The system includes logic integrated with the processor, executable by the processor, or integrated with and executable by the processor. The logic is configured to perform the foregoing method.

Figure 1:
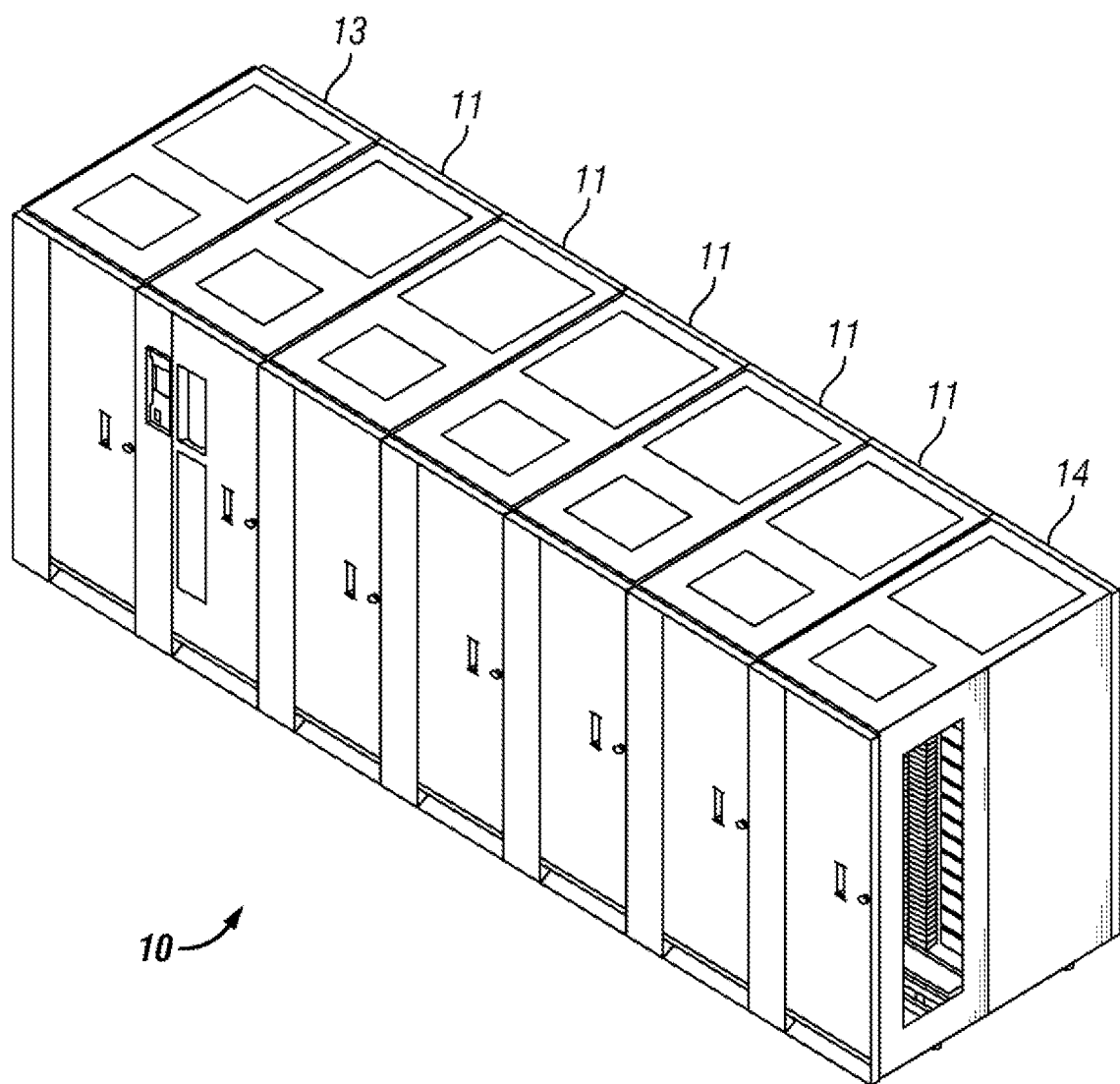
FIG. 1 is a perspective view of an automated data storage library in accordance with one embodiment of the present invention.
Figure 2:
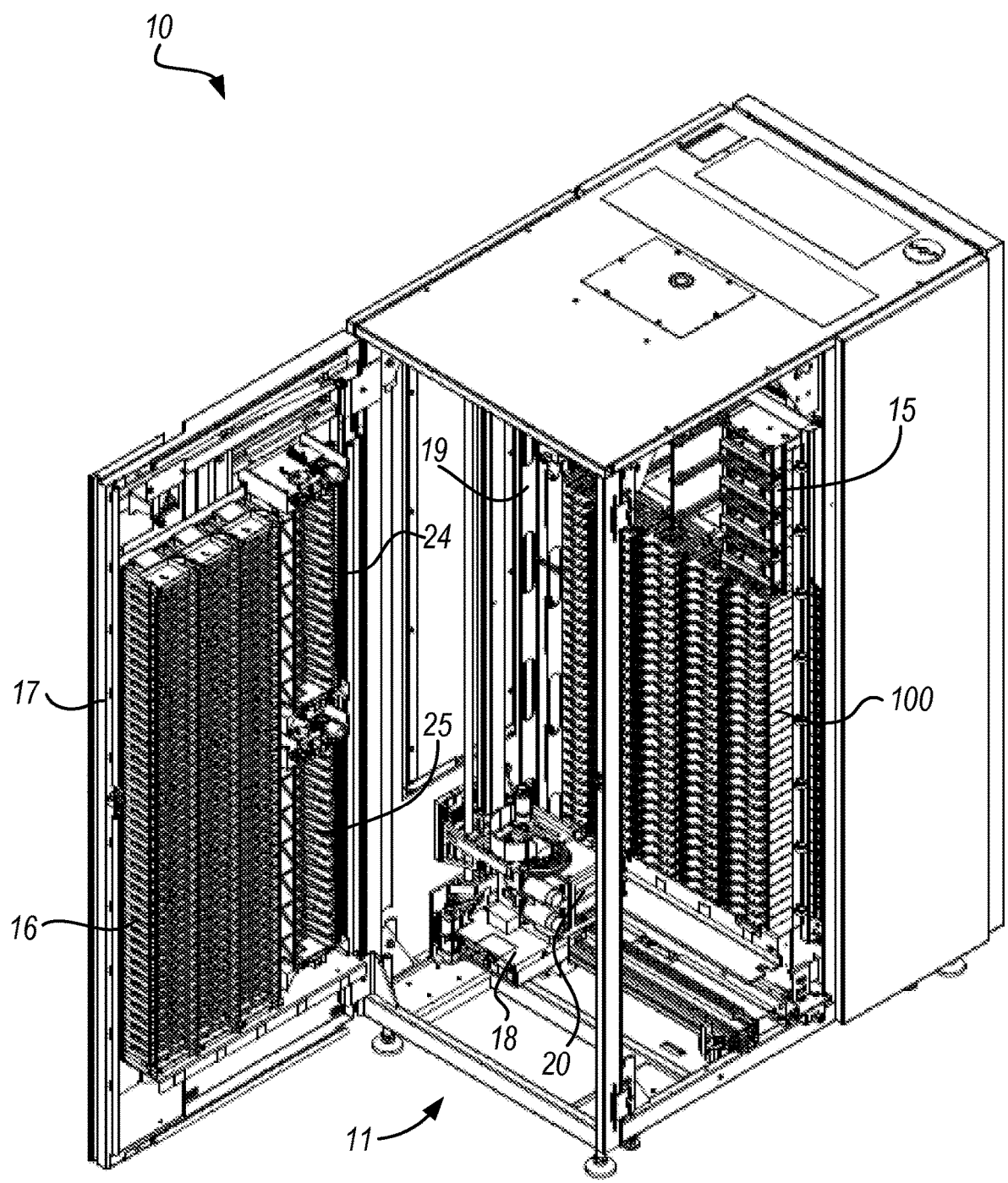
FIG. 2 is a perspective view of a storage frame from the data storage library of FIG. 1 in accordance with one embodiment of the present invention.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM® 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system coupled to the gripper assembly 20, to "read" identifying information about the data storage media.

Figure 3:
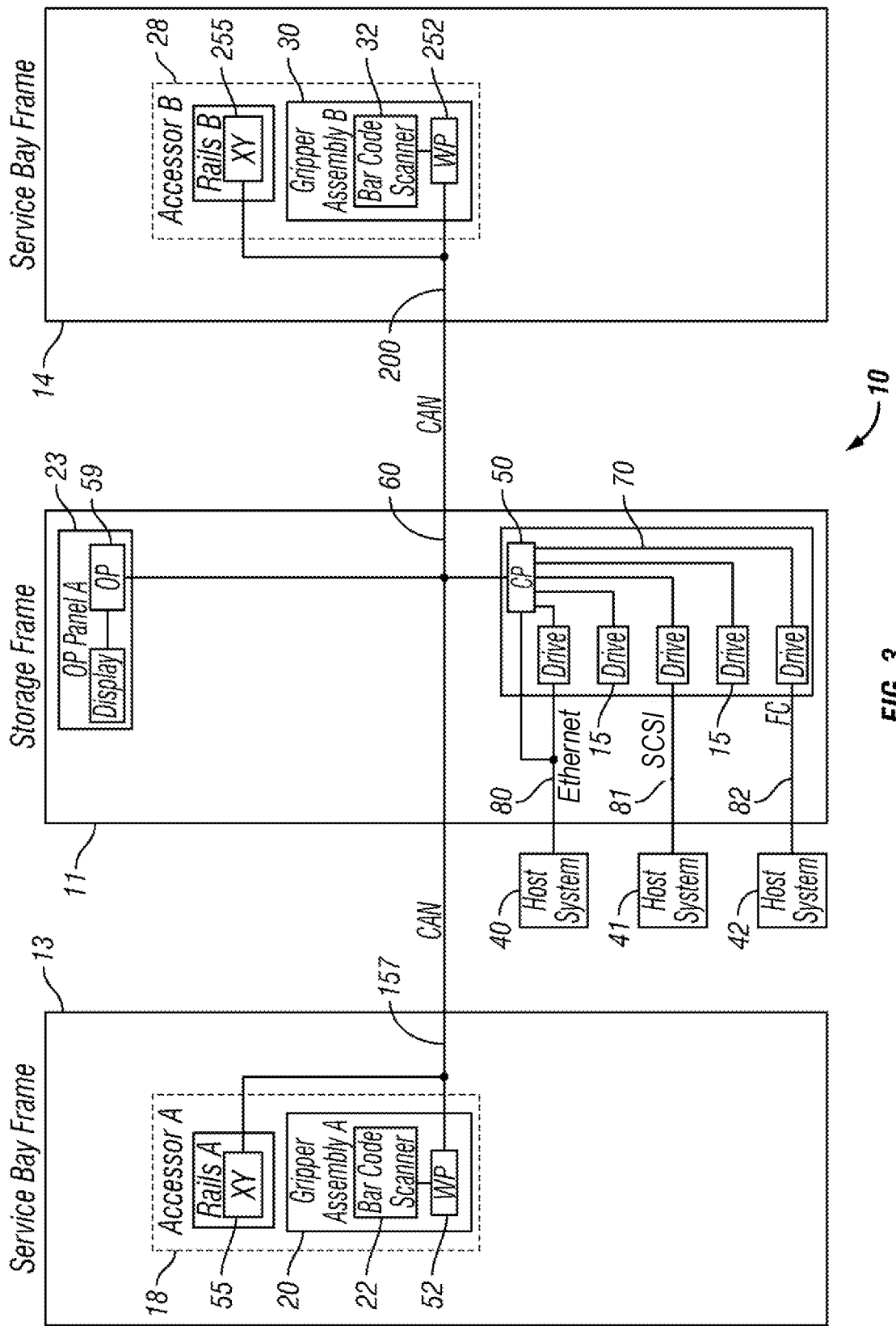
FIG. 3 is a block diagram of an automated data storage library in accordance with one embodiment of the present invention.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus, in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
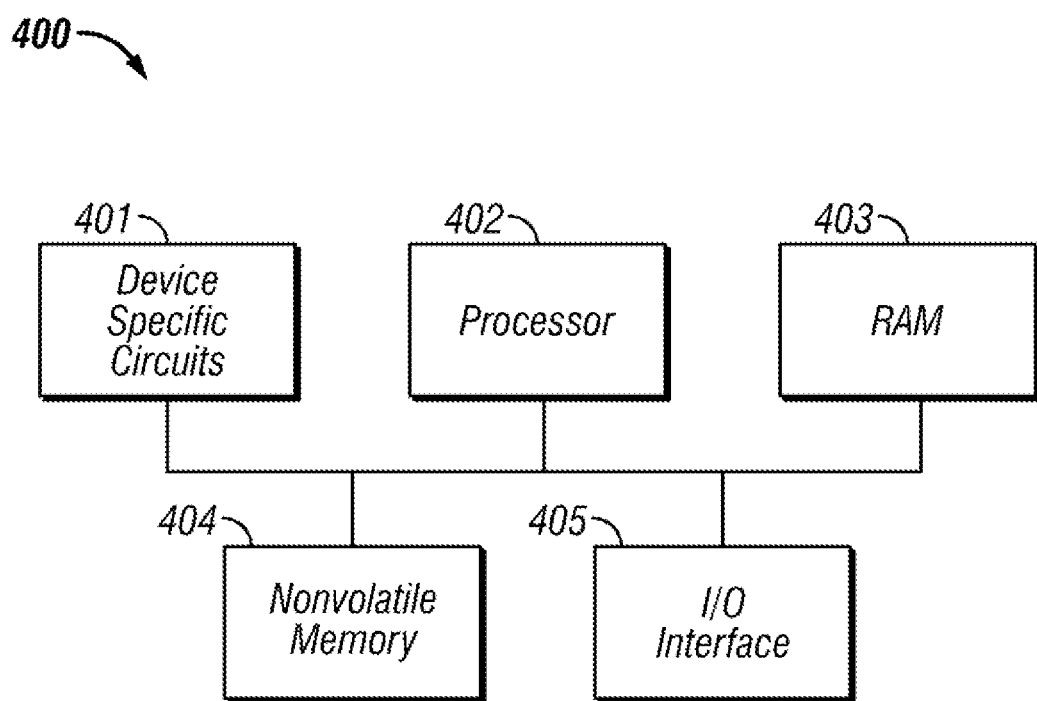
FIG. 4 is a block diagram depicting a controller configuration in accordance with one embodiment of the present invention.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
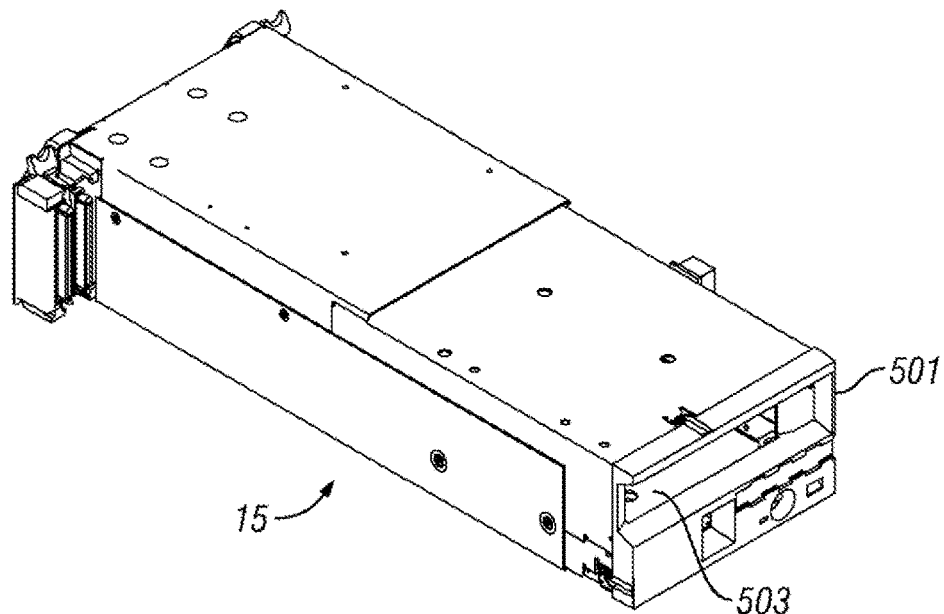
FIG. 5A is a front perspective view of a data storage drive in accordance with one embodiment of the present invention.
Figure 5B:
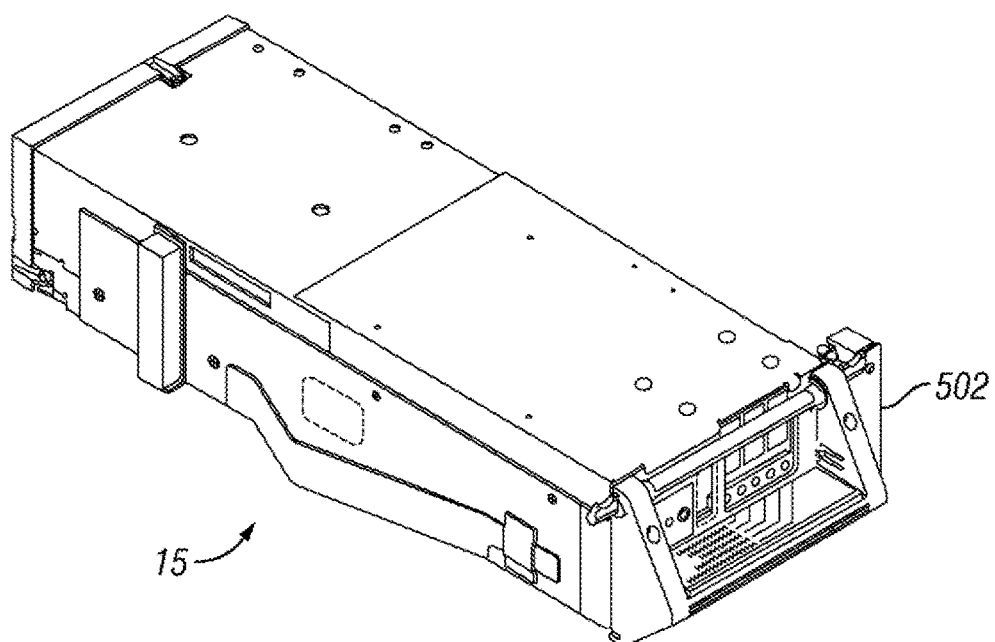
FIG. 5B is a rear perspective view of the data storage drive of FIG. 5A in accordance with one embodiment of the present invention.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
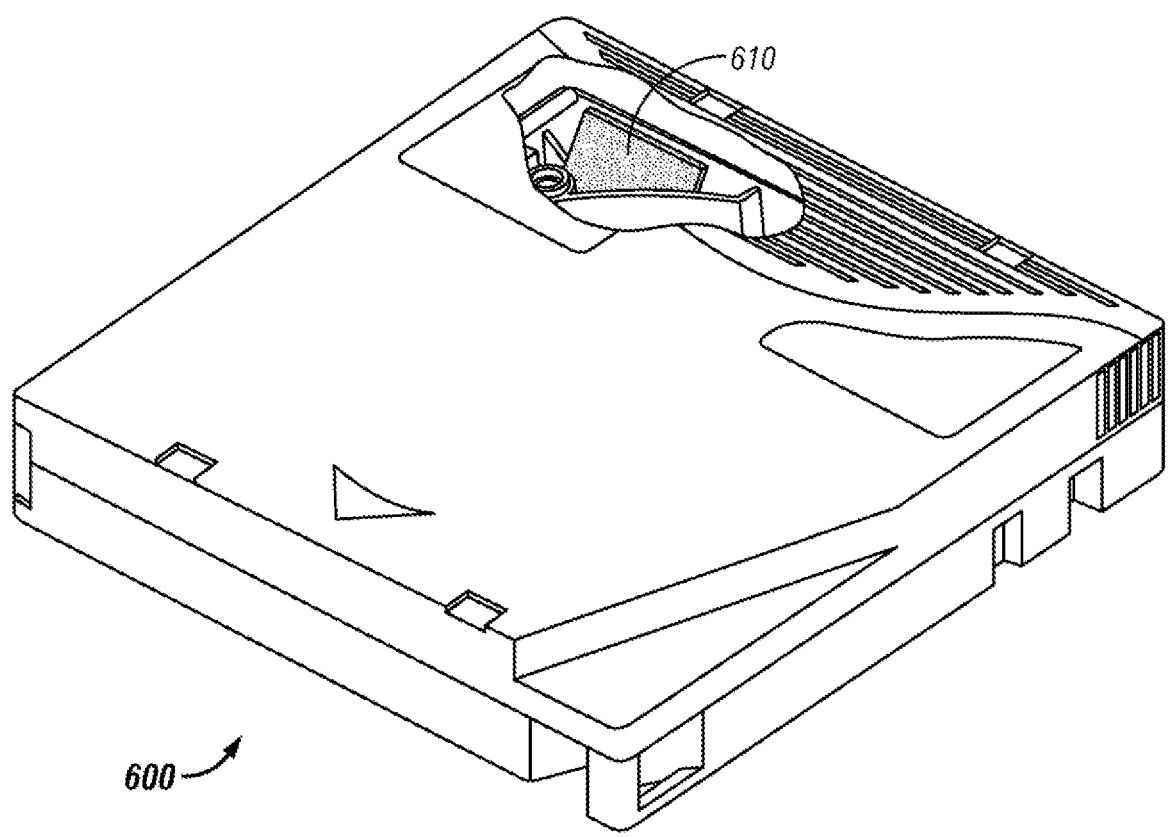
FIG. 6 is perspective view of a data storage cartridge having a cutaway portion, in accordance with one embodiment of the present invention.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 7A:
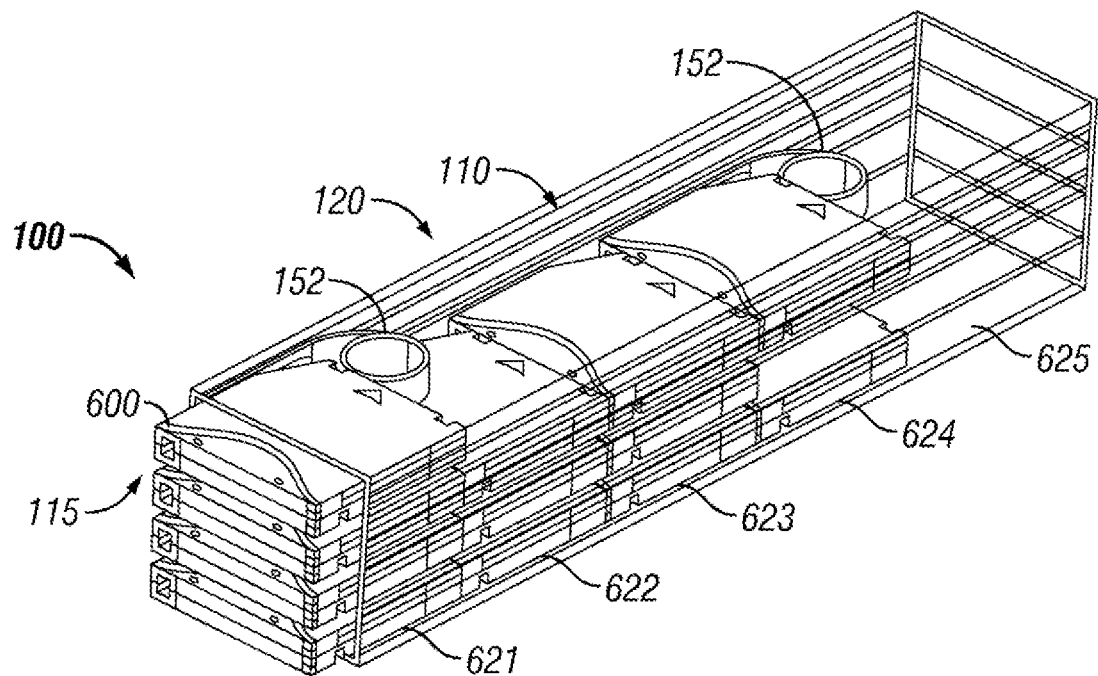
FIGS. 7A-7B are perspective views of a multi-cartridge deep slot cell in accordance with one embodiment of the present invention.
Figure 7B:
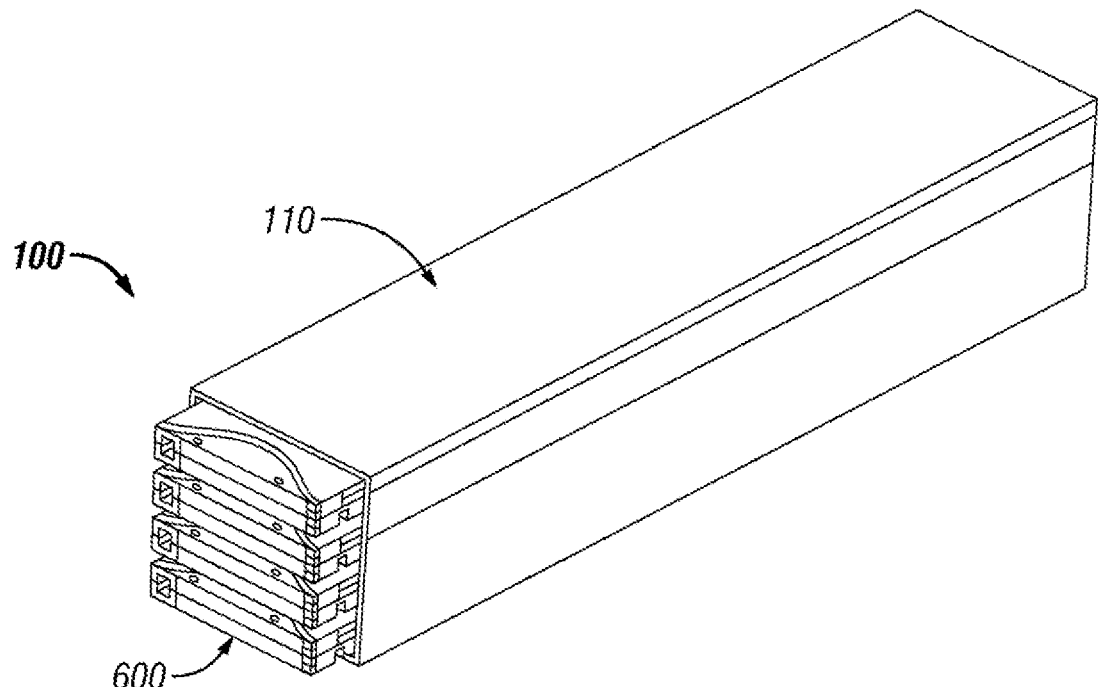

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
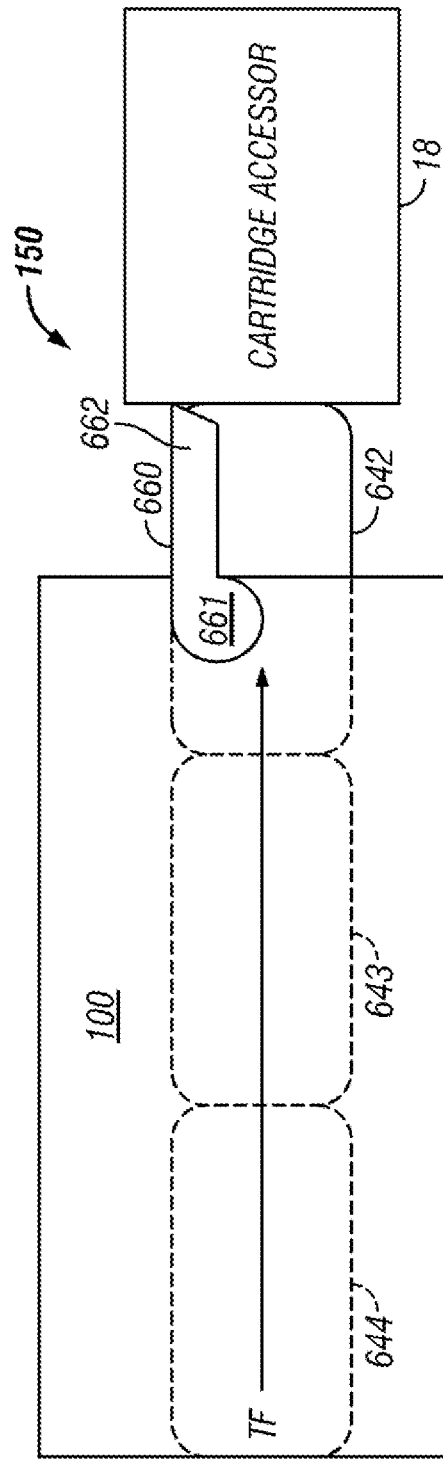
FIGS. 8A-8D are partial side views of a cartridge blocking mechanism in accordance with one embodiment of the present invention.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

Figure 8B:
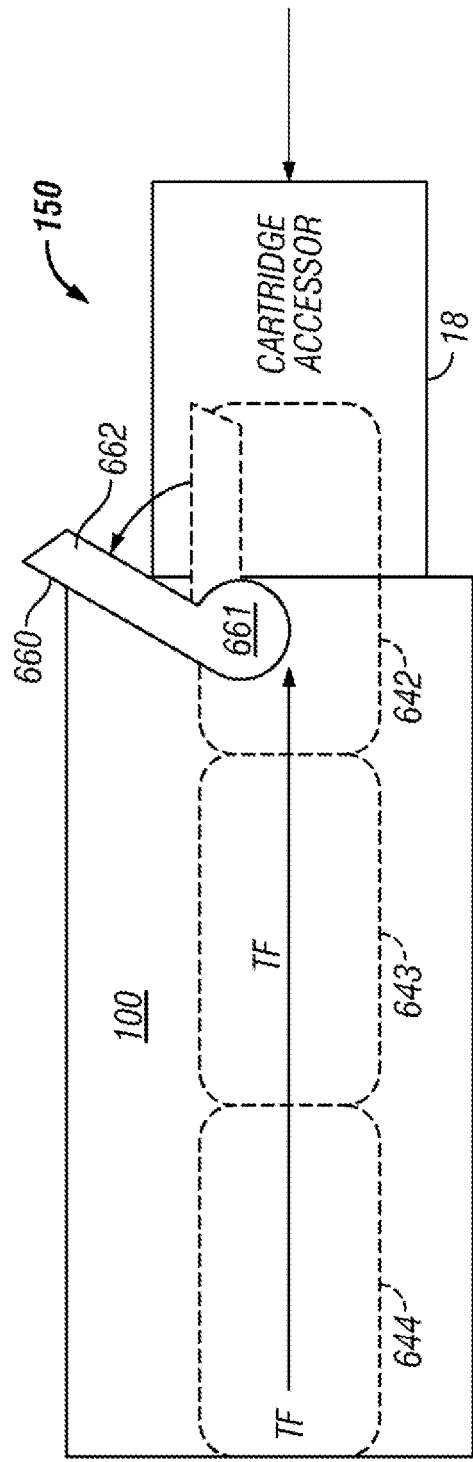
Figure 8C:
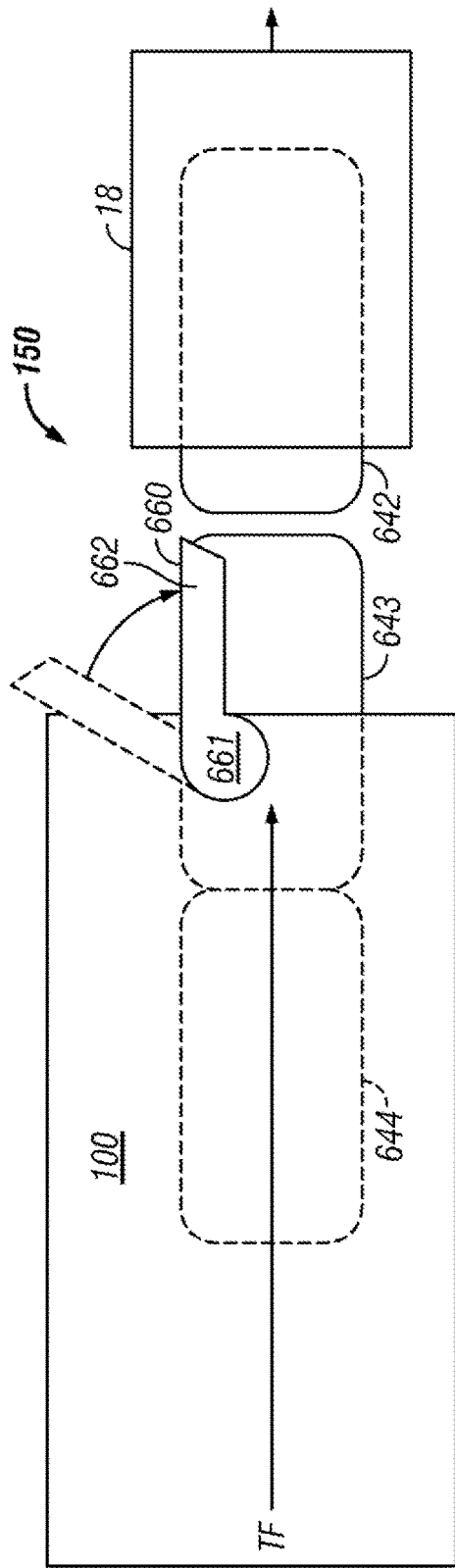

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8D:
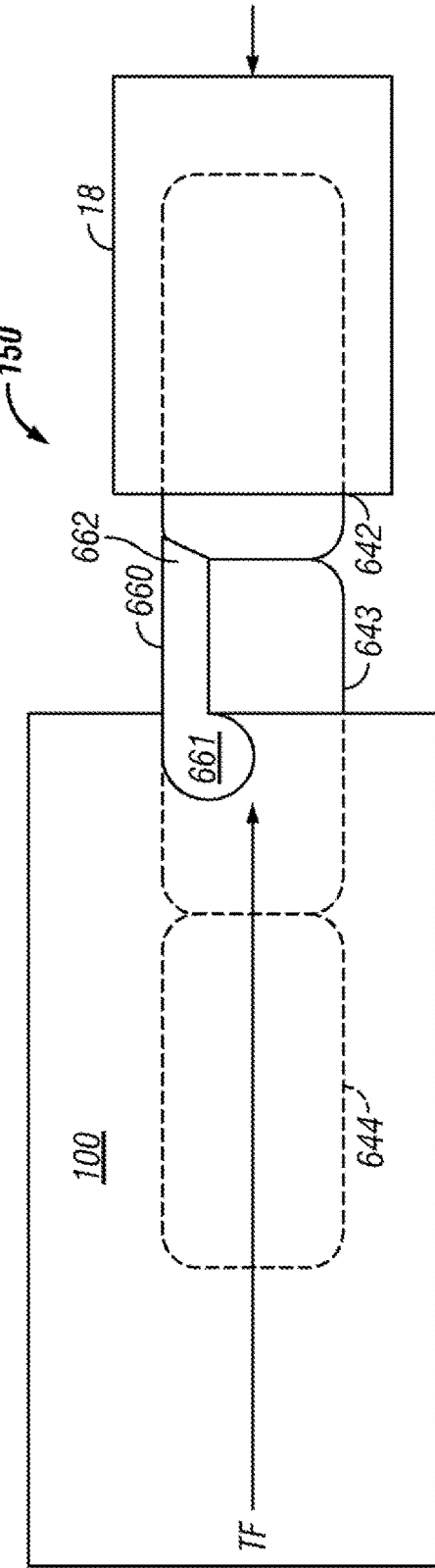

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
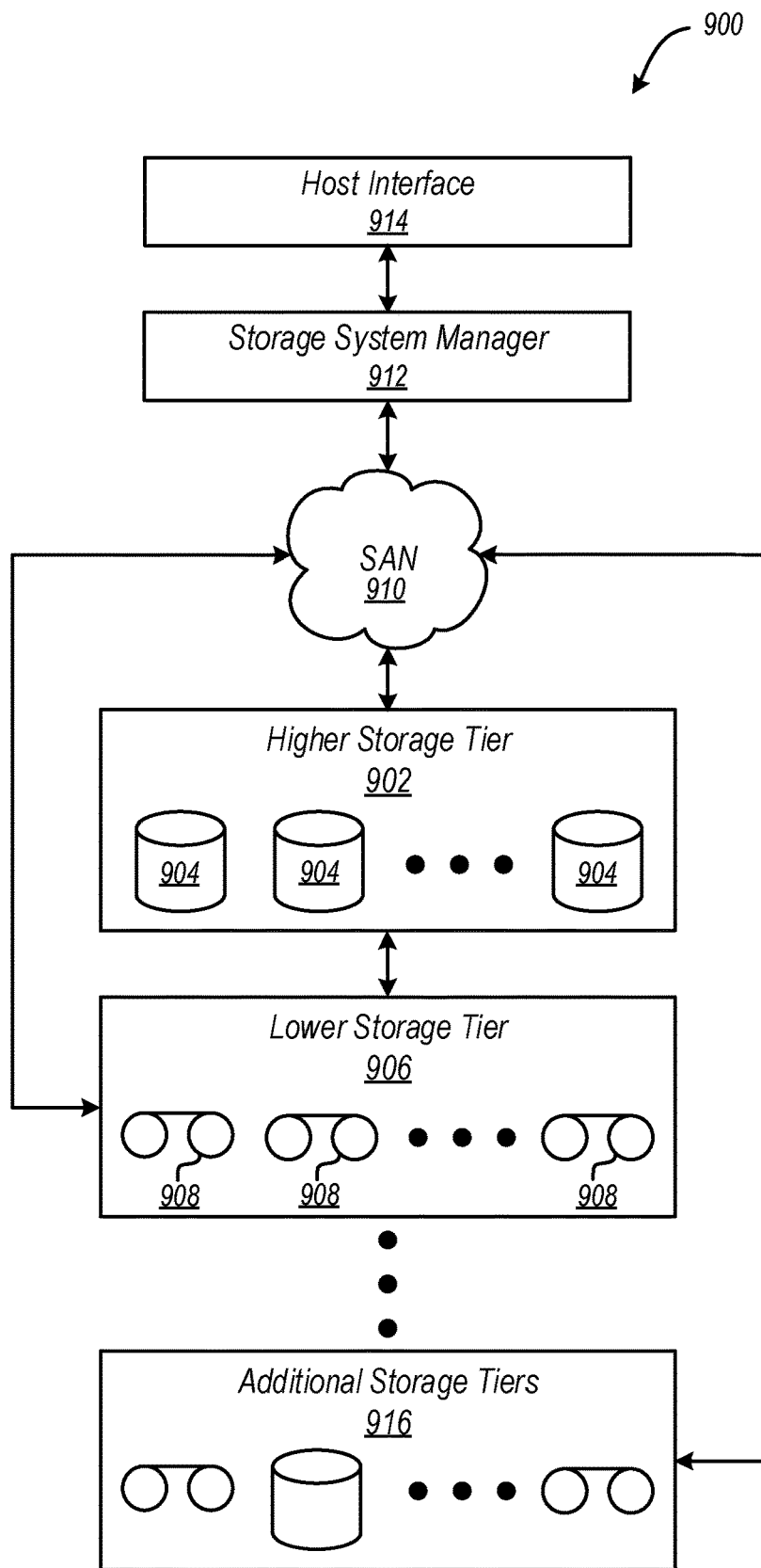
FIG. 9 is a depiction of a tiered data storage system in accordance with one embodiment of the present invention.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

As tape storage technology progresses, more information is stored on a single tape cartridge. Within tape media technologies, the amount of data per unit area being stored to the tape media is increasing in size, meaning that the linear data density and track widths on the tape are decreasing. As dimensions on tape become smaller, alignment of data tracks with the read/write elements of the tape head during operation becomes more challenging. Tape media substrate may begin to creep over time, especially in relatively hotter and/or wetter environments. Substrate creep causes the recording layer to expand with the substrate, causing the pitch of the written tracks to expand. During reading, the pitch of the data tracks is now wider than it was during writing, meaning that the data tracks may no longer be aligned with the readers, especially toward the outermost tracks. Because the writers are no longer centered on the data tracks, the result is noise due to reading adjacent tracks, and in extreme cases, inability to read the written tracks.

During non-use, cartridges having magnetic recording tapes therein are sometimes stored for prolonged periods of time in storage. As a result, the magnetic recording tapes may experience creep, e.g., due to radial compressive stress induced by the tape tension when the tape is wound around a spool prior to storage. Typically, magnetic recording tape creep is not considered a problem for magnetic recording tapes having relatively lower recording densities because any expansion of the tape is typically within permissible tolerances. However, magnetic recording tapes having relatively greater recording densities tend to have much lower reading and writing tolerances, and therefore any change in the tape width due to creep changes the spacing of data tracks on the tape, including the servo tracks and any data tracks previously written. Consequently, the change in tape dimensions is not replicated in the head, and so the transducers will be misaligned with the data tracks, resulting in problems such as overwriting during shingling and/or read errors. Changes in media lateral dimensions may occur during long periods of storage, such as long-term media creep (where the width of the tape creeps from its initial form, also known in the art as "aging"), which tends to occur over time when a tape is wound around a spool of a tape cartridge.

One known method to address alignment issues includes an "archive unload" function which allows tape to be rewound after completion of reading and/or writing with a lower tension to prevent creeping in the tape media. Archive unloading techniques reduce creep for storing data on tape media reliably for long periods of time. Archive unloading requires extra time to completely unwind the tape in the tape drive and then perform the low-tension rewind after the user requested reading/writing on the tape media.

For tape libraries, many users choose to purchase a specific number of tape drives based on capacity and/or throughput requirements. If a tape cartridge requires extra time to perform archive unloading (e.g., low-tension rewind operations), the tape drives are busier and/or consumed for a longer period of time. Thus, the throughput of reading/writing data to tape media is dramatically reduced to perform these additional operations.

In stark contrast, various embodiments of the present disclosure provide a lower cost "rewinder" tape drive that allows for primary tape drives (e.g., the normally operating drives tasked with reading and/or writing operations) to operate without the delays associated with archive unloading techniques. In preferred embodiments, a tape library comprises dedicated tapes drives that perform lower tension rewind operations in addition to normally operating tape drives for reading/writing tape cartridges. The normally operating tape drives may rewind the tapes at normal tension, thereby preserving the drive performance. The "normal" tape drives are then available for the next read/write operations. The automated tape library may take cartridges unloaded from the normally operated tape drives and place them in the rewinder drives which do not read/write any data to the tapes. In various embodiments, the rewinder tape drives unwind the tape and then rewind at a different, lower tension (e.g., relative to the tension wound by the normally operating tape drives). Data is reliably stored on the tape at a lower tension without affecting the access performance of the normally operating tape drives.

Figure 10:
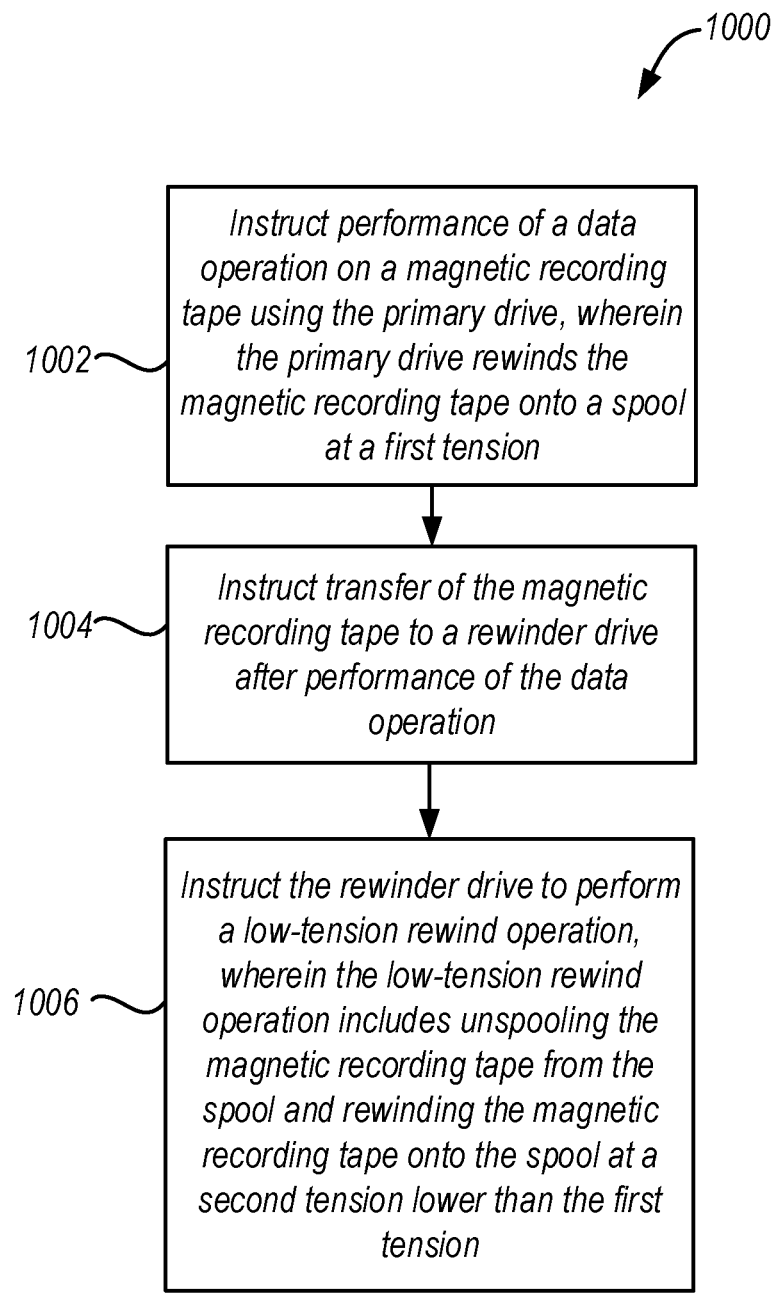
FIG. 10 is a flowchart of a method in accordance with one embodiment of the present invention.

Now referring to FIG. 10, a flowchart of a method 1000 is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of ordinary skill in the art upon reading the present descriptions.

Each of the steps of the method 1000 may be performed by any suitable component of the operating environment. For example, in various embodiments, the method 1000 may be partially or entirely performed by computer, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 includes operation 1002. Operation 1002 includes instructing performance of a data operation on a magnetic recording tape using a primary drive, where the primary drive rewinds the magnetic recording tape onto a spool at a first tension. In preferred embodiments, a data operation includes any type of read and/or write operation as would be understood by one having ordinary skill in the art. In one approach, the primary drive rewinds the magnetic recording tape onto a cartridge spool.

In various embodiments, the first tension is the nominal rewind tension of the primary drive. The nominal rewind tension may vary or lie within a standard operational range. The nominal rewind tension may be determined in any manner known in the art. A nominal rewind tension and/or a value for a nominal rewind tension may be found in a look-up table, determined by a user, determined by a default setting, etc. The "tension" as used throughout the present disclosure refers to the longitudinal tension of the magnetic recording tape as wound onto the spool.

Operation 1004 includes instructing transfer of the magnetic recording tape to a rewinder drive after performance of the data operation. As described in more detail below, the magnetic recording tape may be transferred directly from the primary drive to the rewinder drive. In another approach, the magnetic recording tape may be stored temporarily before being moved to the rewinder drive. The magnetic recording tape may be stored for any predetermined amount of time to be discussed in detail below. Any predetermined value disclosed herein may be found in a look-up table, experimentally determined, statistically determined, based on a default setting, etc.

Operation 1006 includes instructing the rewinder drive to perform a low-tension rewind operation, wherein the low-tension rewind operation includes unspooling the magnetic recording tape from the spool and rewinding the magnetic recording tape onto the spool at a second tension lower than the first tension. In one approach, the second tension may vary or lie within a standard operation range. The standard operational range is preferably lower than the lowest nominal tension of the primary drive. The low-tension rewind operation may be performed at any tension which is lower than the nominal rewind tension of the magnetic recording tape in the primary drive. The second tension is readily determinable by one having ordinary skill in the art using known techniques and/or based on characteristics of the magnetic recording media and/or the primary drive.

Preferably, the instruction causes a robotic accessor to assist in some manner, e.g., unloading the magnetic recording tape from the primary drive and/or loading the magnetic recording tape into the rewinder drive.

In one embodiment, the magnetic recording tape is unwound substantially completely from the spool during the low-tension rewind operation. In one approach, the entire recording portion of the tape is unwound. Creep is most prevalent along the portion of the tape closest to the spool. The portion of the tape closest to the spool experiences the most radial compression. Where the tape leader is present, some of the tape leader coupling the recording portion to the spool may remain wound on the spool. If the recording portion of the tape extends to the spool, some of the recording portion may remain wound around the spool to avoid breakage of the tape at the point of coupling with the spool.

In another embodiment, the only function of the rewinder drive is performing the low-tension rewinding operation. In one approach, the dedicated tape drives for the rewind operations may be in addition to primary tape drives for reading/writing based on work-load and/or spreading of wear on drives. In various embodiments of the present disclosure, the rewinder drives may be relatively lower cost drives than the primary drives. A lower cost drive may refer to a previous generation tape drive, a stripped down version of a tape drive with the sole purpose of rewinding magnetic recording tape at the lower tension (e.g., the second tension), a refurbished drive, etc.

In one alternative approach, the rewinder drive does not have a magnetic head. In another approach, the rewinder drive does not have any host interface attachment electronics, e.g., fiber channel, ethernet, serial attached SCSI (SAS), etc. For example, a stripped down version of a tape drive which does not include many of the components for reading/writing data operations may be used to perform low-tension rewind operations. Components in the drive head and/or for the host attachments may be removed or omitted from the drive in order to produce a lower cost rewinder drive. In various applications, the motors in the drive may be changed to lower cost motors (e.g., motors that do not have high demand requirements for reading/writing data operations). Rewinder drives which do not have a magnetic head minimize the performance impact from the low-tension rewind operations at a minimum cost for the rewinder drives.

In one exemplary implementation, older generation drives which are not compatible for performing reading/writing on new generations of tape media may still be able to perform low-tension rewind operations. An older generation drive may be used where a customer upgrades a primary drive in a tape library and reuses the former primary drive (e.g., the older generation drive), in some approaches, with a specific code upgrade, to perform low-tension rewind functions. In other approaches, older generation drives may be refurbished as rewinder drives. In some configurations, a code level may be applied to a relatively older tape drive, a tape drive with a degraded head, a refurbished drive, etc., which transforms the tape drive into a rewinder drive.

In one approach, primary tape drives which are used for reading/writing data on tapes may continue to work and rewind without a setting for low-tension rewind operations. The tape library may track every tape cartridge that comes out of the primary tape drives and perform a subsequent load of the tape cartridge to a rewinder tape drive that performs the low-tension rewind. The time between a dismount or unload from the normal tape drive and the load in the rewinder tape drive may vary based on requirements and/or environmental conditions in at least some embodiments. In some approaches, the load to the rewinder tape drive may occur directly following the unload from the primary tape drive.

It should be understood by one having ordinary skill in the art that "load" as used herein refers to loading a tape cartridge into a drive. Additionally, it should be understood by one having ordinary skill in the art that "mount" as used herein refers to obtaining information about a loaded tape, such as by reading an index of a tape in a tape cartridge.

In one embodiment, method 1000 comprises instructing the primary drive to rewind the magnetic recording tape onto the spool after a predetermined period of time has elapsed since a last data operation. Any predetermined period of time and/or value may be used, such as one found in a look-up table, experimentally determined, statistically determined, determined by a default setting, etc. The instruction to transfer the magnetic recording tape to the rewinder drive is sent in response to the primary drive rewinding the magnetic recording tape onto the spool. Various host applications and/or customer requirements known in the art for reading/writing data require that cartridges be mounted or loaded to a drive multiple times in a relatively short duration. Operations of the present disclosure minimize the impact of the time required for the low-tension rewind by only performing the rewinding task after a specific amount of time. In various exemplary approaches, a predetermined period of time that has elapsed since a last data operation is at least 15 minutes, in some approaches at least 30 minutes, in further approaches at least 1 hour, at least 6 hours, at least 24 hours, etc.

Preferably, the predetermined amount of time exceeds an expected period of sequential data operations on the tape, where such expected period may be determined using a known method. In one example, a cartridge that gets mounted and/or loaded five times within an hour may only need one low-tension rewind cycle at the end of the five mounts and/or loads in contrast to conventional procedures which result in five low-tension rewinds after each of the five mounts and/or loads. Accordingly, a predetermined waiting period of one hour would prevent performance of low-tension rewinds immediately before a data operation, as well as render the tape available for the data operations rather than being locked in the low-tension rewind procedure.

In another embodiment, method 1000 comprises instructing unloading of the magnetic recording tape from the primary drive and storing the magnetic recording tape. In some approaches, the instruction to unload the magnetic recording tape from the primary drive and storing the magnetic recording tape occurs before moving the tape to the rewinder drive. For example, the instruction to store may occur before moving the tape to the rewinder drive if the tape is deemed likely to be accessed in the near future. A tape which is likely to be accessed in the near future may be determined in any manner known in the art. In a preferred approach, whether a tape which is likely to be accessed in the near future may be determined based on historical load/unload and/or mount/dismount information.

The method may include instructing loading of the magnetic recording tape in the rewinder drive after a predetermined amount of time has elapsed since the magnetic recording tape was unloaded from the primary drive and in response to issuing no further instructions to perform a data operation on the magnetic recording tape. As stated above, the predetermined amount of time may be a default value, a user-selected value, a value selected from a look-up table, calculated based on any of the foregoing factors and/or combination of the foregoing factors, etc.

In some approaches, the time between dismount from the primary drive to loading in the rewinder drive may be dynamic. In one exemplary approach, the predetermined amount of time is specific to the type of magnetic recording tape. The type of magnetic recording tape may include a generation of the magnetic recording tape, a manufacturer of the magnetic recording tape, a model of the magnetic recording tape and/or any other characteristic specific to the magnetic recording tape that is different than other tapes of dissimilar type. For example, different types of media may be more susceptible to tape media creep. In another example, different manufacturers of tape may have unique requirements based on the media formulation which may affect the time between noticeable creep occurs in the media. In yet another example, relatively older tape media is less affected by creep compared to new tape media comprising a higher density of data (e.g., smaller data tracks). A shorter or longer duration between the normal dismount and the low-tension may be implemented based on the foregoing variances.

In another exemplary approach, the predetermined amount of time is specific to the model of the primary drive. For example, the specific amount of time may be selected based on the nominal rewind tension of the primary drive model, e.g., as determined from drive specification, experiments, etc.

In one embodiment, the predetermined amount of time is based on an environmental condition in an environment of the magnetic recording tape. The environment of the magnetic recording tape may include the environment of the tape library, the tape cartridge, the area immediately surrounding the magnetic recording tape, etc.

In a preferred embodiment, the environmental condition is selected from the group consisting of temperature and humidity. For example, in a relatively cold and/or dry environment where creep in the tape media is less of a concern, the time between the cartridge dismount and/or unload from the primary drive and load to the rewinder drive may be relatively longer than in a relatively wet and/or hot environment where creep in the tape media is prevalent. The predetermined amount of time may be adjusted based on readings from sensors located in the tape library and/or in the primary drive which monitor temperature and/or a humidity level.

In preferred approaches, the humidity level is received from a sensor in the tape library. Similarly, the temperature may be received from a sensor in the tape library.

In some approaches, the sensor is outside the tape drives within the tape library. In other approaches, the sensor is in the tape drives. In yet another approach, the humidity level and/or temperature is received from sensors in the tape library outside the tape drives within the tape library and from sensors in the tape drives. In approaches where multiple humidity levels and/or temperatures are received, the humidity levels and/or temperatures may be averaged, normalized, transformed, rescaled, adjusted, etc. In other approaches, the humidity level and/or temperature is received from sensors outside the tape library.

In another embodiment, the instruction to transfer the magnetic recording tape to the rewinder is given in response to determining that a robotic accessor is idle. The instruction may be sent to the robotic accessor. Conventional automated tape libraries have relatively fast robotic performance to minimize the time required from when a host command is received, to when a tape cartridge is placed into a drive for reading/writing data. The robotic accessor in these conventional automated tape libraries have relatively significant amount of idle time between cartridge moves. Accordingly, the various operations for transferring the magnetic recording tape to the rewinder drive may be performed during this idle time to prevent the overall library performance from being negatively affected. Instructing the transfer in response to determining that the robotic accessor is idle improves the efficiency of low-tension rewind operations.

Conversely, robotic accessors have peak times for performing many cartridge loads in a short time period. To avoid delays during peak times, the moves to the rewinder drives may be given a lower priority in the queue of moves for the accessors relative to the priority assigned to moves to the primary drive. Adjusting the priority of the moves to the rewinder maximizes the performance of the primary drive in the tape library. A priority of moves may be determined and/or modified in any manner known in the art.

In various approaches, the rewinder drive is located in a robotic accessor service bay of a tape library. Many tape libraries are not completely fully loaded with drives. There may be several drive bays in the tape library that are empty. Rewinder tape drives may be placed in these empty drive bays. In other approaches, the rewinder drive may be located in the service area of the tape library (e.g., elastic storage zones). In some approaches, a primary drive is located in a higher availability drive slot and a rewinder drive is located in a lower availability drive slot.

For example, an automated tape library may comprise a plurality of slots, which are designated as "higher availability slots" and relatively "lower availability slots." "Higher availability" slots may be those that are accessible by each of one or more accessors that serve in the automated tape library. Higher availability slots preferably remain accessible by at least one accessor during the e.g., servicing, downtime, etc. of one or more of the remaining accessors. Lower availability slots may be accessed, e.g., in order to store library cartridges, etc., by of one or more accessors that serve in automated tape library. Slots in the servicing location may be designated as lower availability cells. In various approaches, slots may refer to drive slots and/or storage slots in the tape library.

For example, in a tape library which has dual accessors for high availability, each accessor may have an individual service area for performing service operations on that accessor. Since the rewinder drive is preferably not connected to a host and does not have any unique drive/host attachments, the rewinder drive may be placed in drive bays in the service areas that are only accessibly by one of the two accessors. These drive bays are preferably considered low availability cells where the drive bays are inaccessible during accessor service operations.

In one exemplary implementation, rewinder drives are located in a service area of the tape library such that the rewinder drives are able to perform rewinding operations without interfering with normal data operations, nor using precious higher availability drive slots more appropriately filled with primary drives.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
instructing performance of a data operation on a magnetic recording tape using a primary drive, wherein the primary drive rewinds the magnetic recording tape onto a spool at a first tension;
instructing transfer of the magnetic recording tape to a rewinder drive after performance of the data operation; and
instructing the rewinder drive to perform a low-tension rewind operation,
wherein the low-tension rewind operation includes unspooling the magnetic recording tape from the spool and rewinding the magnetic recording tape onto the spool at a second tension lower than the first tension.

2. The computer-implemented method of claim 1, wherein the magnetic recording tape is unwound substantially completely from the spool during the low-tension rewind operation.

3. The computer-implemented method of claim 1, wherein the only function of the rewinder drive is performing the low-tension rewinding operation.

4. The computer-implemented method of claim 1, wherein the rewinder drive does not have a magnetic head.

5. The computer-implemented method of claim 1, comprising instructing the primary drive to rewind the magnetic recording tape onto the spool after a predetermined period of time has elapsed since a last data operation, wherein the instruction to transfer the magnetic recording tape to the rewinder drive is sent in response to the primary drive rewinding the magnetic recording tape onto the spool.

6. The computer-implemented method of claim 1, comprising instructing unloading of the magnetic recording tape from the primary drive and storing the magnetic recording tape; and instructing loading of the magnetic recording tape in the rewinder drive after a predetermined amount of time has elapsed since the magnetic recording tape was unloaded from the primary drive and in response to issuing no further instructions to perform a data operation on the magnetic recording tape.

7. The computer-implemented method of claim 6, wherein the predetermined amount of time is specific to the type of magnetic recording tape.

8. The computer-implemented method of claim 6, wherein the predetermined amount of time is specific to the model of the primary drive.

9. The computer-implemented method of claim 6, wherein the predetermined amount of time is based on an environmental condition in an environment of the magnetic recording tape, the environmental condition being temperature and/or humidity.

10. The computer-implemented method of claim 1, wherein the instruction to transfer the magnetic recording tape to the rewinder drive is given in response to determining a robotic accessor is idle, wherein the instruction is sent to the idle robotic accessor.

11. The computer-implemented method of claim 1, wherein the rewinder drive is located in a robotic accessor service bay of a tape library.

12. A computer program product, the computer program product comprising a computer readable storage medium having program instructions embodied therewith, the program instructions executable by a computer to cause the computer to:
instruct, by the computer, performance of a data operation on a magnetic recording tape using a primary drive, wherein the primary drive rewinds the magnetic recording tape onto a spool at a first tension;
instruct, by the computer, transfer of the magnetic recording tape to a rewinder drive after performance of the data operation; and
instruct, by the computer, the rewinder drive to perform a low-tension rewind operation,
wherein the low-tension rewind operation includes unspooling the magnetic recording tape from the spool and rewinding the magnetic recording tape onto the spool at a second tension lower than the first tension.

13. A system, comprising:
a primary drive configured to perform data operations on magnetic recording tapes;
a rewinder drive configured to perform a low-tension rewind on magnetic recording tapes;
a processor in communication with the drives; and
logic integrated with the processor, executable by the processor, or integrated with and executable by the processor, the logic being configured to:
instruct, by the processor, performance of a data operation on a magnetic recording tape using the primary drive, wherein the primary drive rewinds the magnetic recording tape onto a spool at a first tension;
instruct, by the processor, transfer of the magnetic recording tape to a rewinder drive after performance of the data operation; and
instruct, by the processor, the rewinder drive to perform a low-tension rewind operation,
wherein the low-tension rewind operation includes unspooling the magnetic recording tape from the spool and rewinding the magnetic recording tape onto the spool at a second tension lower than the first tension.

14. The system of claim 13, wherein the magnetic recording tape is unwound substantially completely from the spool during the low-tension rewind operation.

15. The system of claim 13, wherein the only function of the rewinder drive is performing the low-tension rewinding operation.

16. The system of claim 13, wherein the rewinder drive does not have any host interface attachment electronics.

17. The system of claim 13, comprising instructing the primary drive to rewind the magnetic recording tape onto the spool after a predetermined period of time has elapsed since a last data operation, wherein the instruction to transfer the magnetic recording tape to the rewinder drive is sent in response to the primary drive rewinding the magnetic recording tape onto the spool.

18. The system of claim 13, comprising instructing unloading of the magnetic recording tape from the primary drive and storing the magnetic recording tape; and instructing loading of the magnetic recording tape in the rewinder drive after a predetermined amount of time has elapsed since the magnetic recording tape was unloaded from the primary drive and in response to issuing no further instructions to perform a data operation on the magnetic recording tape.

19. The system of claim 13, wherein the instruction to transfer the magnetic recording tape to the rewinder drive is given in response to determining that a robotic accessor is idle, wherein the instruction is sent to the idle robotic accessor.

20. The system of claim 13, wherein the rewinder drive is located in a robotic accessor service bay of a tape library.

* * * * *